United States Patent [19]

Jacob

[11] Patent Number: 4,459,344

[45] Date of Patent: * Jul. 10, 1984

[54] METHOD FOR PRODUCING RAISED IMAGES BY XEROGRAPHIC MEANS

[76] Inventor: Ezekiel J. Jacob, 79 Washington St., Brooklyn, N.Y. 11201

[*] Notice: The portion of the term of this patent subsequent to Dec. 2, 1992 has been disclaimed.

[21] Appl. No.: 283,437

[22] Filed: Jul. 15, 1981

Related U.S. Application Data

[60] Continuation of Ser. No. 845,033, Oct. 25, 1977, abandoned, which is a continuation-in-part of Ser. No. 618,008, Sep. 30, 1975, abandoned, which is a division of Ser. No. 379,468, Jul. 16, 1973, Pat. No. 3,945,934, which is a continuation-in-part of Ser. No. 100,516, Dec. 21, 1970, abandoned.

[51] Int. Cl.³ .............................................. G03G 13/12
[52] U.S. Cl. ....................................... 430/97; 430/126
[58] Field of Search ........................ 430/97, 126, 110; 106/7 S; 252/378 R

[56] References Cited

U.S. PATENT DOCUMENTS

| | | | |
|---|---|---|---|
| 1,954,325 | 4/1934 | Martinez | 430/11 |
| 2,297,691 | 10/1942 | Carlson | 430/31 |
| 3,440,076 | 4/1969 | Vaurio | 427/195 |
| 3,629,380 | 12/1971 | Edwards | 264/53 |

OTHER PUBLICATIONS

Benning, Plastic Foams, vol. 1 (1969) p. 634.

*Primary Examiner*—John D. Welsh

[57] ABSTRACT

Raised Xerographic printing is produced by the use of thermally intumesced electroscopic powders for the development of electrophotographic images. Intumescent electroscopic powders are belended with the powdered pigmented "ink" or "Toner" in the ink reservoir of a Xerographic copying machine. The image is formed and transferred to a paper carrier in the well-known process of Carlson, U.S. Pat. No. 2,297,691. The heat used in thermoadhesively attaching the "Toner" to the paper carrier also causes great intumescence of the intumescent powder, resulting in a raised image. The image is similar in appearance and texture to "engraving" or raised thermographic printing. It can be read by the sightless by tactile recognition. The intumescent powder used is made of vinylidene-chloride-acrylonitrile-isobutane as described by the inventor in his Disclosure Document No. 001078 filed in the U.S. Patent Office on Dec. 22, 1969.

5 Claims, No Drawings

METHOD FOR PRODUCING RAISED IMAGES BY XEROGRAPHIC MEANS

RELATED APPLICATION

This is a continuation of application Ser. No. 845,033 filed Oct. 25, 1977, abandoned, which is a continuation-in-part of application Ser. No. 618,008 filed Sept. 30, 1975 now abandoned which was a division of application Ser. No. 379,468, filed July 16, 1973, now U.S. Pat. No. 3,945,934 issued Mar. 23, 1976, which was a continuation-in-part of application Ser. No. 100,516, filed Dec. 21, 1970, now abandoned.

SUMMARY OF THE INVENTION

The present invention relates to raised Xerographic printing, to compositions for the production thereof and to a process for producing raised Xerographic printing. The present invention also relates to raised printing from other electrophotographic processes and to compositions for use in the production thereof.

The present invention involves a xerographic toner composition comprising a stable, dry, free-flowing, self-contained intumescent electroscopic powder mixture including a thermo adhesive agent, a pigment and a dry intumescing agent, comprised of particulate matter capable of liberating gas by thermal decomposition incorporated therein.

One object of the present invention is to open up the vast body of printed information to the blind by producing raised copies from any flat printed subject matter without any need for transcribing into Braille, and using only the cheap instantaneous copying machines such as the "Xerox" office copier. A further object is to produce engraved-type printing suitable for letterheads, business cards, and the like, and to reproduce flat written or printed matter as raised-printing copies. To produce this single sheet as raised printing would entail making an engraving or setting type, then either embossing or thermographic printing, at a cost of about $200 and after several hours of effort. However, this actual sheet with its raised printing was produced on a Xerox copier for five cents in fifteen seconds, using the toner of the present invention. A further object is to produce raised printing plates for flexographic printing and for offset printing with grained surfaces for better inking. A further object is to produce raised characters on carriers suitable for contact character recognition to replace largely, optical character recognition used at present in data processing.

Another object is to produce a multi-component Xerographic Toner having improved triboelectric properties which will reproduce the faintest mark very sharply yet leave the background clean and free from smudges and "scum". Yet another object is to produce a multi-component Xerographic toner which will attain great increase in volume when heated after xerographic deposition on a carrier.

Another object is to produce a multi-component Xerographic toner which will release an organic material in the process of intumescene and during the heating cycle, thus achieving the desideratum of solvent fixing of an electrostatic image as taught in Carlson U.S. Pat. No. 2,776,907, but achieved in a different and cumbersome manner, in said patent.

DESCRIPTION OF THE PREFERRED EMBODIMENT

To achieve above mentioned and other object, I merely add to 100 volumes of a commercially available Xerox Toner one-tenth of a volume and up to 200 volumes or more of foamable microspheres. By using the appropriate toner for a particular Xerox model machine, and by simply therein adding the foamable microspheres I get raised copies immediately upon use, without any need to adjust the heat in the fusing section, the exposure time, the dwell time and other variables. Of course other compositions of intumescent toners are taught by this invention and these can be used at any intended temperature depending upon the thermal stability of the carrier sheet selected. These intumescent toners may or may not liberate a gas upon heating, but in every case they attain great expansion.

EXAMPLE 1

Toner, Xerox 813: 100 volumes,
Foamable microspheres: 0.1 volume.
Foamable microspheres are made by the Dow Chemical Co. of Midland, Michigan. It is a powder composed of vinylidene chloride-acrylonitrile-isobutane having a particle size of about ¼ to 20 micron with an average of 8 microns. I found that this powder is electroscopic and hence used it as an admixture with the Xerox toner with the intention of reducing the overall cost of the Toner. However I noticed that the copies came out in a raised condition. The characters were very sharp and the background very clean. Magnified 25 times the characters imprinted showed a well packed raised structure having a grained appearance rather like many brown to black balloons closely compacted together instead of the usual Xerox characters which have a molten and solidified flowed lava like appearance with fissures, cracks and dusting.

EXAMPLE 2

Toner, Xerox 813: 100 volumes,
Foamable microspheres: 1 volume.
The copies came out from the Xerox 813 raised to 0.001".

EXAMPLE 3

Toner, Xerox 813: 100 volumes,
Foamable microspheres: 5 volumes.
The copies came out raised to 0.002".

EXAMPLE 4

Toner, Xerox 813: 100 volumes,
Foamable Microspheres: 7.5 volumes.
The copies came out raised to 0.0025".

EXAMPLE 5

Toner, Xerox 813: 100 volumes,
Foamable microspheres: 8 volumes.
The copies came out raised to 0.003".

EXAMPLE 6

Toner, Xerox 813: 100 volumes,
Foamable microspheres: 20 volumes.
The copies came out raised to 0.006" and are sufficient for reading by the blind by tactile means.

EXAMPLE 7

Toner, Xerox 813: 100 volumes,

Foamable microspheres: 50 volumes.

The copies came out raised to 0.006". The characters were fluffy and not well anchored due to the short time in the heating chamber of the machine as compared with the time probably needed to heat such a mass. Subsequent heating in an oven at 275 degrees F. caused further intumescence instantly upon exposure, to a height of 0.010". The sheet with the high lettering on it was then sprayed with artists fixative labelled as clear acrylic spray. Upon drying the characters shrank down to 0.008" due to solvent action from the sprayed fixative. Resulting sheet was suitable for use as a rubber stamp or for flexographic printing plate.

EXAMPLE 8

An intumescent toner was made without the use of the foamable microspheres, using thermally unstable gas-liberating material.

Staybellite Ester 19 (Hercules): 100 grams,
Silica Aerogel (Cabosil): 5 grams,
Carbon Black, Monarch 71: 5 grams,
Gutta Percha: 10 grams,
Nitrosan (E. I. DuPont): 5 grams.

Mix on a rubber mill all the items except the last at 60 degrees C. Use a scraper blade on the back roll to take off the mass as it mixes and feed it back into the bite of the two rolls. Cool to 40 C. Mix in the Nitrosan. Take off by first putting cool water into the rolls and using the back scraper blade. Cool and grind to <200 mesh (74 microns). This toner is highly adhesive to the carrier sheet upon heating and intumesces about five to ten times in volume. The Gutta Percha develops high shear and adiabatic heat during mixing and is very brittle when cold, thus facilitating grinding. The toner after grinding should be dusted with Silica Aerogel to keep it free flowing and avoid caking. This Toner rises 0.002". "Nitrosan" is N,$N^1$-Dimethyl N,$N^1$-dinitrosothalamide. It liberates Nitrogen Gas upon thermal decomposition at 80 to 100 degrees C. Other thermally unstable compositions might be used. Azo compounds like Azodicarbonamide, Azoisobutyro dinitrile, Benzene Sulfohydrazide, Amine such as dinitrosopentamethylene tetramine, are all useful. The plastic material in which the gas liberating agent is incorporated, can be any thermoadhesive known to the art, which is dry and free-flowing at room temperatures, such as Vinyl resins, Styrene resins, Acrylic and acrylic co-polymer resins, Cellulose ester-resins, Polyamides, phenolic resins and co-polymers thereof, butadiene polymers, polyethylene and the polyolefins, natural resins, such as the asphaltum and Gilsonite of Carlson U.S. Pat. No. 2,297,691. The ration of the thermally unstable component to the plastic material may be varied, and so may the selection of the species of either one component or both components to yield the intumesence toner of this example, and to vary the "rise" if desired.

EXAMPLE 9

An improved toner composition to replace the Xerox 813 toner should the latter be unavailable is made as follows:

Poly n-Butyl Methacrylate: 100 grams,
Poly-iso-butyl Methacrylate: 100 grams,
Tri-ortho-cresyl phosphate: 5 grams,
Dibutyl Tin Dilaurate: 2 grams,
Butyl Stearate: 2 grams,
Foamable microspheres: 5 grams,
Irgacet oil-soluble black(Ciba): 1 gram,
Monarch 71 Carbon Black: 10 grams,
Alumina Hydrate: 5 grams,
Silica Aerogel (cabosil): 1 gram.

The above was mixed on a two roll rubber mill 6"×12" heated to 230 F. The ingredients were added in the order given. The foamable microspheres foamed up and then melted with the heat thereby becoming a part of the composition with the exception of its iso-butane content which was lost. The purpose of their inclusion is to create affinity for the foamable microspheres which will later be mixed in as a powder to the above milled and communited product. The above composition was sheeted out to fifteen mils, and ground down to <200 mesh (74 microns), and was used in place of the Xerox 813 toner. To 100 volumes of the above toner there was added 5 volumes of foamable microspheres. The copies were very sharp and raised 0.002". The dye dyed the microspheres somewhat during foaming and improved the jetness of the raised printing.

The intumescent toner compositions described in examples 1 through 9 are very stable and consistent in results. The toner of example 3 was used daily for 8 hours a day for six months in the Xerox 813 machine, and the toner tank was routinely replenished when low. Raised printing copies always came out. Pre-heated, or pre-foamed microspheres used in example 9, and containing predominantly air in partial replacement of the isobutane or other gas are useful outside of the particle Example 9. Thus, air-containing microspheres may be used as in examples 1 through 6 either as the sole microsphere component or as admixtures with the foamable microspheres. Their air content suffices to produce usable amounts of intumescence in the toner composition. Microspheres containing a gas other than air or isobutane are also useful in the practice of this invention. Nitrigen gas may be used, and microspheres containing Nitrogen, used as in examples 1 through 9, excluding 6 and 7, produce usable amounts of intumescence in the xerographic print.

An unexpected and beneficial effect is obtained from the use of the intumescent toners of this invention in the Xerox copier, namely the protection of the soft amorphous selenium photoconductor drum from scratching caused by one of the ingredients of the triboelectric system used in the toner applicator. This ingredient is called commercially the "developer". The developer has no relationship to a photographic developer as used in photography and understood in photochemistry, since it consists of glass beads about 0.050" in diameter and coated with a resin which is stated to be polyvinyl butyral plus phenolformaldehyde soluble resin composition as described in U.S. Pat. No. 2,618,551. The "developer" remains in the toner applicator and is not consumed. It mixes with the toner and develops a charged attachment for the fine toner particles. As these coated developer beads with their incubus of charged particles of toner are cascaded across the surface of the Selenium drum they surrender their toner burden to the charged areas and continue to roll across the face of the drum ready to scavenge adhered black toner particles from the light-discharged areas which should be clean and free from stray toner. Scratched drums are a common service and replacement problem yet the glass beads are essential to good xerographic printing and must be tolerated even if they scratch the drum, which they do. The introduction of my foamable microsphere component in the present known two-component Xerox toner system, namely Toner plus Glass Bead "developer"

seems to have affected the triboelectric system since the glass beads now come away cleanly from the drum, do not scratch, and indeed to an outstanding job in scavenging the uncharged areas of the selenium drum. We have had no scratching of the Selenium drum during the entire time we have used the foamable microsphere-containing intumescent toner. Thus a costly service problem on the soft selenium drum has been eliminated. The clean sharp raised printing and the cleanliness of the background are caused by and are the direct benefit of the triboelectric system created by the inclusion of microspheres in any form, but in one preferred embodiment as foamable microspheres, in unfoamed form first with their occluded material, then during their transition from unfoamed to foamed condition with simultaneous expansion or liberation of the material contained therewithin. The probable explanation of the triboelectric phenomenon, which is advanced as a theory and not as a limitation of the invention is that while the xerographically-transferred toner is being subjected to heat sufficient to cause intumescence thereof and to adhere it to the carrier sheet or surface, the heat causes the microspheres to move relative to the other particles in the toner or relative to each other in a rubbing action. Triboelectricity is the electricity generated by rubbing surfaces or unlike electrical charges against each other. Thus when a plastic hair comb is stroked against a piece of fur the comb becomes triboelectrically charged and can pick up dust particles in the manner of a magnet picking up iron filings. Thus my toner particles by reason of triboelectricity generated by rubbing during the very last stage of the Xerographic process, act as magnets to pull in peripheral stray particles and generate a clean, tight, coherent deposit of toner.

The liberation of gas by a toner is a novel feature of my invention, since the gas is liberated only when needed, in the heating zone and during fixation of the thermoadhesive toner to the carrier sheet. This makes for quick fusion of the toner. The advantages of solvent fixing were preceived by Carlson in U.S. Pat. No. 2,776,907 and in Rheinfrank & Jones U.S. Pat. No. 2,788,288 column 5, lines 65-70. However all the prior art is cumbersome, teaching the use of solvent as a separate process and in cumbersome and in impractial manner. My invention achieves gas fixing simultaneously with intumescence and the creation of raised Xerographic printing. The foamable microspheres of this invention and in all the examples given are dry, free-flowing electroscopic powders, and are in no way wet or soggy with solvent.

To standardize upon toner pick-up the Light-Dark setting of the 813 Xerox machine was set at the second lightest notch, i.e., two notches down from "L" setting in the direction of the "D" setting.

EXAMPLE 10

Foamable Microspheres: 100 volumes,
Irgacet Black Oil soluble dye (Ciba): 0.5 volumes in 100. vols of Heptane.
Above was mixed, dried on trays at room temperature, then broken up into powder by ball milling. The dyed microspheres were used as the sole toner in the Xerox 813 copier. They behaved as a highly swellable ink or toner. They rose to 0.010" and adhered to the paper carrier by virtue of their inherent thermoadhesiveness since they are composed of vinylidene-chloride-acrylonitrile. Post-heating in an oven at 300 F. caused further momentary intumescence followed by a melting down with increase in attachment to the paper.

EXAMPLE 11

Foamable Microspheres: 100 volumes
The above was used as sole toner in the Xerox 813. Raised white lettering came out of the copier. The structure was like densely packed translucent hollow balloons thermoadhesively attached to the paper carrier and to the other swelled particles. A three mil (0.003") clear Mylar film was used instead of the paper carrier. The copy came out as raised whitish translucent letters on a transparent plastic background. The legend could be read densitometrically or by electro-optical means, or used in photographic processes. Dense sections of the original gave copy areas with correspondingly more light scattering effects.

A direct-reading original was converted into direct reading copy as above on Mylar film in conventional fashion using conventional Xerox 813 Toner. This was then fed face down into the copier and a copy was made on 3 mil Mylar film using the composition of this example. The resulting copy was reverse-reading and was suitable for flexographic printing or for use as rubber-stamps. The chemical resistance of the vinylidene-chloride acrylonitrile and its resistance to solvents encountered in printing inks and rubber-stamp inks are both very great, and since this is the composition of the intumesced characters of my invention, the suitability for long-run printing using these patterned mylar printing plates is excellent. The solvent resistance of Xerox toners 813, 914, and the IBM Xerographic toner are all very poor compared with the Vinylidene-Chloride-acrylonitrile deposited from my intumescent toner. In fact the simple addition of my toner to the poor-solvent-resistent toners mentioned serves to increase solvent resistence and thus improve resistance to printing-ink-caused deterioration of printing or offset masters.

A prime coat or an anchor coat is desirable upon the Mylar film since this would be cheaper than using the thermoadhesiveness of the intumesced microspheres. I use the following for the anchor coat:

Acryloid A-101 (40% solids) (Rohm & Haas, N.Y.): 100 gm,
Acryloid B-72 solid material: 40 gm,
Vinyl Chloride-Acetate copolymer (Bakelite VYHH): 18 gm,
Tin Mercaptide (RS 31 M&T Corp Rahway, N.J.): 2 gm,
Methyl Ethyl Ketone: 500 gm,
Methyl Isobutyl Ketone: 498 gm,
Cyclohexanone: 2 gm.

The above are dissolved together and coated on to the Mylar with a wire-wound rod (called a "Meyers" Rod). A #3 rod gave the least possible usable anchor coat while a #30 Meyers Rod gave the most with the above solution which was 10% solids. Spraying with Freon propellant by Aerosol was satisfactory for laying down the anchor. While Aerosol application is satisfactory for shop application it does not give the accuracy of the pre-coated Mylar done accurately as metered by the Meyers rods.

On such pre-coated Mylar film the anchorage of the raised Xerographic copy print is tenacious and serves for long press-runs for flexographic or offset printing.

EXAMPLE 12

Color reproduction was the objective. The foamable Microspheres were dyed as follows: in the colors Red, Yellow, Blue.

Foamable Microspheres: 100 volumes,
Heptane: 100 volumes,
Dye: 1 volume.

For Red we used Irgacet Red; for Yellow Irgacet Yellow; for Blue, Irgacet Blue; all made by Ciba Co., NYC, NY. In each case the mixture was dried in air then pulverized into the original free-flowing powder consistency. We successively copied the blue separation with blue-dyed foamable microspheres, red separation with red dyed foamable microspheres, and yellow separation with yellow-dyed foamable microspheres, upon the same paper carrier in register.

The colors all are in raised printing with greater height achieved for deeper tones. A grid was used called the "Xerox document carrier" which is ruled grid-patterned clear plastic envelope or cover, the grid being placed over the separation as it entered the copier for reproduction. Due to the fact that intensity of color was copied as multi-level raised deposits, we obtain the advantages of "Frost imaging" as described in Dessauer and Clark Chapter XIII page 375. These plastic distortion patterns act as photographic negatives when viewed through transmitted light, especially if the carrier used was a transparent Mylar film coated with a thermoadhesive achor coating as in Example 11.

The advantages of "Flushing" or merging of color boundary patterns can be achieved by hot-pressing the raised image against a smooth platen. The height of the color characters is thus converted into depth of color with pleasing melding of boundary lines of the separations. We used a one mil half-hard aluminum foil as the platen, placed the paper carrier with the high-to-low raised color printing against it and then fed the two pieces through the hot roller and the hot backing shoe of the hot copy machine made by the Minnesota Mining and Manufacturing Company and sold under the trade name and "CASUAL COPIER". The two pieces were heat-pressed together. Upon cooling, the aluminum foil was separated leaving a single-plane color impression on the paper carrier. Any method of heating and pressing can be used, not necessarily the Casual Copier. The aluminum foil comes with a coating of lubricant from the rolling mill and hence can be stripped radily from the vinylidene-chloride-acrylonitrile thermoadhesive composition of my intumesced-detumesced raised printing xerographic toner.

EXAMPLE 13

Silk-Screens are produced in this example by the use of the formula in Example 11 and following the technique of post pressing of formula according to Example 12.

A pattern was thus deposited on bolting cloth about 120 × 80 thread count. It came from the Xerox 813 copier with densely filled raised patterned areas having the appearance of dense white flocking. Hot-pressing according to Example 11 smoothed down the raised texture and caused gap-free bridging of the open mesh of the screen where the pattern had been xerographically deposited, thus a silk-screening squeegee could be used with free and smooth travel for the ink application.

EXAMPLE 14

Foamable Microspheres: 100 volumes,
Barium Ferrite <200 mesh: 100 volumes,
Xerox 813 Toner: 10 volumes.

The powders are mixed in a tumbler for 30 minutes, then used in the ink reservoir (toner tank) of the Xerox 813. The copies come out raised 0.001". Further heating for 30 seconds at 300 F. raises and then partly collapses the raised legend due to melting down. The characters can be read magnetically, or by a beam of light above the plane of the paper carrier and in the same plane direction, or by electrical contact, or by mechanical contact as by a whisker of springy material.

EXAMPLE 15

The characters on the paper carrier as produced in Example 14 are magnetized and used as a magnetic printing master. A particulate ink is magnetically attracted to the magnetized lettering and then transferred to a paper carrier by contact and heating. Non-contacting transfer is possible by electrical means, whether electromagnetic or electrostatic. Particulate ink magnetically attractable to the magnetic printing master might be of the general formulation as follows:

Black Iron Oxide $Fe_3O_4$—FeO (Pfizer, NYC): 100 volumes,
Particulate thermoadhesive binder <200 mesh: 100 volumes.
(For example the Xerox 813 Toner)

For raised printing the particulate thermoadhesive binder is preferably unfoamed microspheres.

EXAMPLE 16

The phenomenon of converting unfoamed microspheres into dense white microballoons upon heating and then detumescing the foamed white multi-sphered layer by the application of further heat with consequent melting and transparentizing of said white layer, is usefully employed in the production of chart paper by xerographic techniques. The ink of example 11 is used as the sole toner in the Xerox 813 toner tank. The paper carrier is black in color. A grid design is fed in as an original to be copied. The grid emerges as a dense white flocked multi-sphered coating on the black chart paper, almost obscuring the black background except for ordinate and co-ordinate rulings. A hot stylus or a non-contacting source of heat will detumesce and transparentize the white raised xerographic printing, transparentizing it according to the pattern of the stylus travel. Thus chart paper for electrocardiographic recording machines can be produced easily and cheaply. The exposure of the black background is the inkless recording of the stylus pattern.

My process for producing raised or embossed copies from a Xerox 813 machine will also be operable on any other Xerox machine, any other xerographic copying machine and any other electrostatic copying machine.

If the photoconductor is a paper carrier with coating thereon my process will still work by electrophoretic deposition from a dispersion of foamable microspheres in non-polar liquid solvents. Deposit of the intumescent toner can also be from aerosol, either dry cloud or misty liquid. The embossed-looking products produced according to my invention can be de-bossed by pressing or melting down to the flat condition either overall as in the silk-screens of example 13 or in selected areas only. Thus a raised-type Xerox copy with say, a letterhead on top of the paper carrier, can be pressed down in the area excluding the letterhead, thus creating a multi-textured copy having a raised letterhead and flat subject matter otherwise. Advertising material, direct mail pieces, labels, can be attention-getting by reason of the expensive look of raised printing coupled with selective debossing of areas to produce a multi-level textured design in the printed areas. Furthermore, there is no restriction on the toner to "Xerox 813 Toner", but rather the designation "Xerox 813 Toner" is meant to include any pigmented thermoadhesive particulate material having any desired melting point, any desired specific heat, and any desired specific adhesion, and these can readily be compounded by anyone skilled in the art. Wherever raised legend is required on whatever carrier, it is the spirit of my invention to produce it in the manner detailed above and to supply this part as part of any graphic arts process or electronic or optical or electrical or mechanical process or product and to include such utilization of this invention and its claims within the spirit and scope of such modifications and extensions.

I claim:

1. A method of producing raised images by xerographic means comprising the steps of
   (a) producing an electrostatic latent image on a xerographic member;
   (b) contacting said member with a dry, free-flowing, self-contained intumescent electroscopic toner to develop said image, said toner comprising a thermoadhesive agent, a dry pigment and a solid, dry, particulate intumescing agent;
   (c) transferring the distributed toner from said member to a transfer surface, and
   (d) subjecting said transferred toner to heat sufficient to decompose said intumescing agent so as to liberate nitrogen gas and cause intumescence of the toner and thereby provide a permanent raised image on said transfer surface.

2. The method according to claim 1 in which said thermoadhesive agent is at least one material selected from the group consisting of copolymers of styrene and methacrylate esters, isoprene, polyethylene, phenol-formaldehyde copolymers, butadiene polymers, melamine resin, asphaltum, and vinyl resins.

3. The method according to claim 1 wherein said particulate material is comprised of at least one compound selected from the class consisting of N,N'-dimethyl-N,N'-dinitrosophthalamide, azisobutyro dinitrile and azodicarbonamide.

4. The method according to claim 1 wherein said intumescing agent is $N,N^1$-dimethyl-$N,N^1$-dinitrosophthalamide which liberates nitrogen gas at about 80° C. to about 100° C.

5. The method according to claim 1 wherein the toner is raised about 0.002" on said copy.

* * * * *

UNITED STATES PATENT AND TRADEMARK OFFICE
CERTIFICATE OF CORRECTION

PATENT NO. :   4,459,344
DATED       :   July 10, 1984
INVENTOR(S) :   E.J. Jacob It is certified that error appears in the above-identified patent and that said Letters Patent is hereby corrected as shown below:

```
On line 4 of the Abstract, change "belended" to --blended--.

On page 1, line 64, change "intumescene" to --intumescence--.

On page 2, line 1, change "object" to --objects--.

On page 3, line 51, change "ration" to --ratio--.

On page 3, line 55, change "intumescence to --intumescent--.

On page 5, line 3, change "to" to --do--.

On page 5, line 40, change "preceived" to --perceived--.

On page 7, line 28, change "achor" to --anchor--.

On page 7, line 40, change "and" to --as--.
```

Signed and Sealed this

Twenty-sixth Day of March 1985

[SEAL]

Attest:

DONALD J. QUIGG

Attesting Officer     Acting Commissioner of Patents and Trademarks